(12) United States Patent
Lehrieder

(10) Patent No.: US 7,912,570 B2
(45) Date of Patent: Mar. 22, 2011

(54) LOGISTICS SYSTEM FOR MANAGING AT LEAST A WAREHOUSE OF A PRINTING COMPANY THAT OPERATES AT LEAST ONE PRINTING PRESS

(75) Inventor: Erwin Paul Josef Lehrieder, Gaukönigshofen (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 448 days.

(21) Appl. No.: 12/084,989

(22) PCT Filed: Nov. 9, 2006

(86) PCT No.: PCT/EP2006/068294
§ 371 (c)(1),
(2), (4) Date: May 14, 2008

(87) PCT Pub. No.: WO2007/057345
PCT Pub. Date: May 24, 2007

(65) Prior Publication Data
US 2009/0055014 A1 Feb. 26, 2009

(30) Foreign Application Priority Data

Nov. 16, 2005 (DE) .......................... 10 2005 054 496

(51) Int. Cl.
*G06F 19/00* (2006.01)
*G06F 15/00* (2006.01)
*B41J 11/44* (2006.01)
(52) U.S. Cl. ............................ 700/123; 358/1.6; 400/76
(58) Field of Classification Search .................. 700/123; 358/1.6; 400/76
See application file for complete search history.

(56) References Cited

U.S. PATENT DOCUMENTS

| 5,922,402 A * | 7/1999 | Speeney .................... 427/208.6 |
| 6,334,587 B1 | 1/2002 | Roder |
| 6,409,401 B1 | 6/2002 | Petteruti et al. |
| 6,802,659 B2 * | 10/2004 | Cremon et al. ................. 400/76 |
| 7,117,798 B2 | 10/2006 | Lehrieder |
| 2006/0127154 A1* | 6/2006 | Barrus et al. .................... 400/76 |
| 2007/0177965 A1 | 8/2007 | Gretsch et al. |

(Continued)

FOREIGN PATENT DOCUMENTS

DE 196 53 814 6/1998

(Continued)

*Primary Examiner* — Albert Decady
*Assistant Examiner* — Sivalingam Sivanesan
(74) *Attorney, Agent, or Firm* — Jones, Tullar & Cooper, P.C.

(57) ABSTRACT

An accompanying document for a printing substrate, which is to be printed in a printing press, is configured as an electronic data set that is stored in a memory of an RFID tag. Data relating to a production-preparatory generation of an adhesive surface, on the printing substrate to be fed to the printing press, is written into the data set. Data relating to the manufacturer of the printing substrate of to its supplier, and data relating to the manufacture of the printing substrate are also written into the data set. In the case of a commercial unit having a printing substrate that has been only partially printed during a production run of the printing press, the data set can be supplemented with data which, at least, characterizes an event. The event could relate to a break in the printing substrate or to changes to the commercial unit which occurred during the production process that was implemented in the printing press using the printing substrate of the commercial unit.

25 Claims, 1 Drawing Sheet

U.S. PATENT DOCUMENTS

| | | | |
|---|---|---|---|
| 2007/0223014 A1* | 9/2007 | Lenkl | 358/1.6 |
| 2008/0068169 A1* | 3/2008 | Hoshina | 340/572.1 |
| 2008/0307686 A1* | 12/2008 | Wade et al. | 40/638 |

FOREIGN PATENT DOCUMENTS

| | | |
|---|---|---|
| DE | 100 43 752 | 3/2002 |
| DE | 10 2004 003 859 | 8/2005 |
| GB | 2 333 207 | 7/1999 |
| GB | 233207 A * | 7/1999 |
| WO | WO 98/28213 | 7/1998 |
| WO | WO 03/080484 | 10/2003 |
| WO | WO 2004/075103 | 9/2004 |
| WO | WO 2005/077797 | 8/2005 |
| WO | WO 2005/102719 | 11/2005 |

* cited by examiner

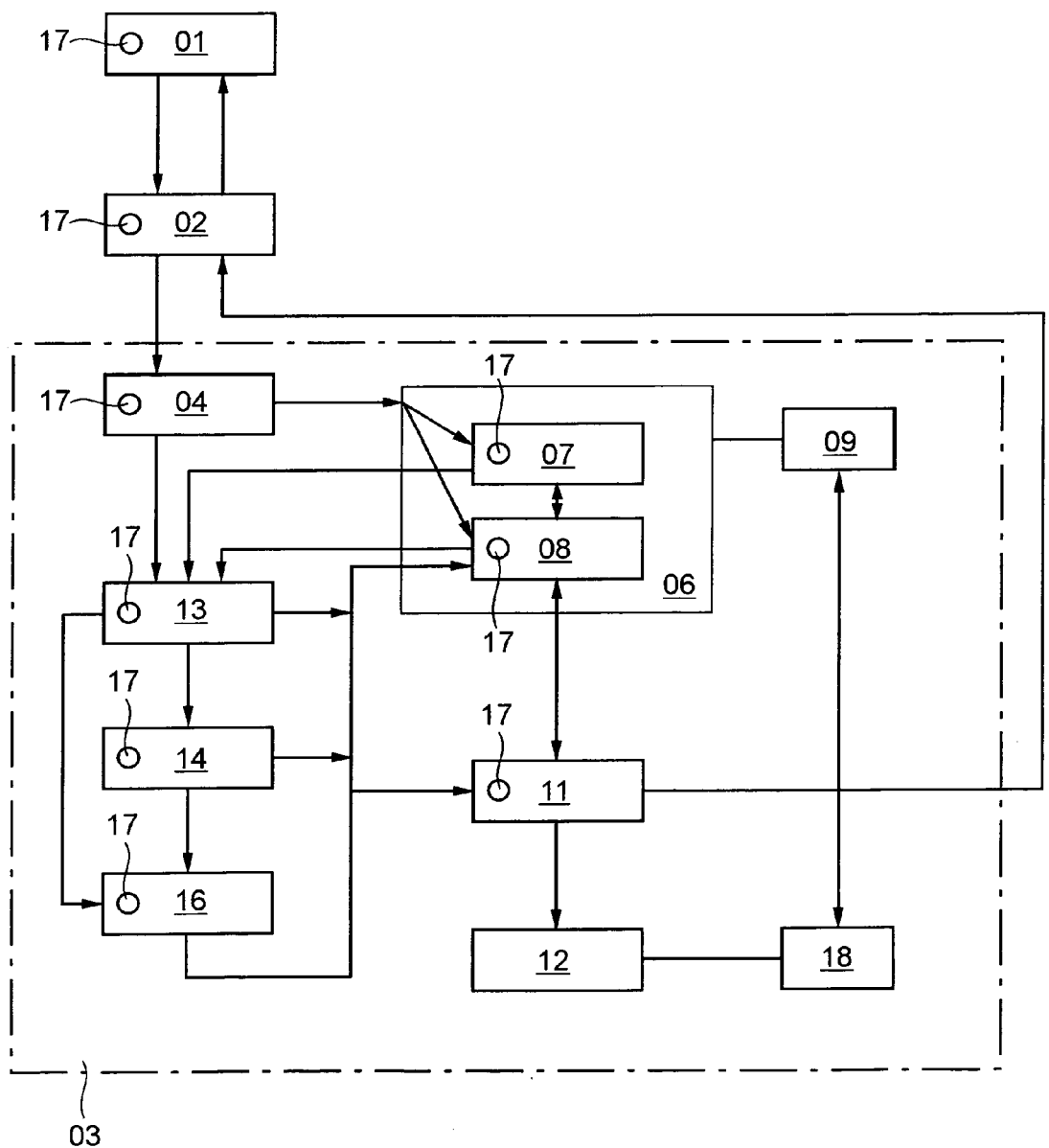

LOGISTICS SYSTEM FOR MANAGING AT LEAST A WAREHOUSE OF A PRINTING COMPANY THAT OPERATES AT LEAST ONE PRINTING PRESS

CROSS-REFERENCE TO RELATED APPLICATIONS

This application is the U.S. national phase, under 35 USC 371, of PCT/EP2006/068294, filed Nov. 9, 2006, published as WO 2007/057345 A1 on May 24, 2007 and claiming priority to DE 10 2005 054 496.7, filed Nov. 16, 2005, the disclosures of which are expressly incorporated herein be reference.

FIELD OF THE INVENTION

The present invention is directed to a logistics system for managing at least a warehouse of a printing company that operates at least one printing press. The warehouse holds an amount of printing substrate that is required for a specific production period and supplies the printing substrate to the at least one printing press based on production. An accompanying document is assigned to the printing substrate and is configured as an electronic data set which is stored in a memory of an RFID tag.

BACKGROUND OF THE INVENTION

GB 23 33 207 A specifies the provision of a winding core of a reel of paper produced in a paper mill with an RFID or radio frequency identification tag, in order to be able to monitor a delivery of the reel of paper from the paper mill to a printing press, which printing press will print on the reel of paper, and to also be able to monitor the use of this reel of paper in the printing press. The RFID tag, which is applied to a reel of paper, when it is produced in the paper mill, is written with data once the reel of paper has been packaged for shipping in the paper mill. This data describes the structural properties of the reel of paper product. For example, it may contain length, width, and base weight information, and information on its delivery, such as, for example, information on manufacturer, product serial number, customer, and delivery address. This data can be read multiple times during transit of the reel of paper from the paper mill to the printing press, and can be evaluated in an electronic data network.

WO 2005/077797 A2 is directed to a method for storing unprepared and prepared reels of material, which are intended for a web-processing machine, in a warehouse. A bar code on the reels of material supplies data to a material flow system.

WO 2004/075103 A1 discloses a reel of paper including a paper web that is wound around a core. The core is equipped with an RFID tag. That RFID tag exchanges data with a handling device which is used to transport the reel of paper.

WO 98/28213 A1 describes a reel of paper with a code carrier, which code carrier is configured as an electronic component with a data memory. The data from the code carrier can be exchanged in contactless fashion with a writing and reading head, that is configured as an electronic component, and which is operating in a frequency range of, for example, 70 kHz. This can be accomplished by inductive coupling, such as, for example, via the generation of an alternating magnetic field between the code carrier and an assigned writing and reading head, wherein the code carrier can be inductively encoded and read. Code carriers that are based on the principle of inductive coupling require a relatively large amount of structural space in order to achieve a reasonable level of efficiency of the coupling, or in other words to achieve a minimum achievable intensity in the magnetomotive force with the magnetic field, which transmits energy and/or data. This requires that the code carrier and the associated writing and reading head be oriented toward one another. Due to the rapid drop in intensity in the inductive coupling, as the distance between the code carrier and an associated writing and reading head increases, such devices can be used only for relatively short transmission distances, most frequently much shorter than 1 m. These are serious disadvantages for a logistics system that will be used for paper reel logistics.

DE 100 43 752 A1 is directed to a method and to a system for managing logistical processes that occur between components of a logistics chain, and for tracking shipment along the logistics chain. The use of overwritable RFID transponders is proposed, which devices are read and are also written via assigned RFID read/write devices. Based upon designation data, and upon data that are read out from a respective RFID transponder, logistical processes are confirmed and are accepted.

DE 10 2004 003 859 A1 relates to a method for controlling a process. Data is stored in a transponder and/or is read from a transponder. A process for handling a product is also described. The product is assigned a transponder. Data that is relevant to the product and/or to the handling of the product is read and/or is stored in the transponder.

A materials transport system, having a network of tracks with a number of transport cars that can be moved on the tracks, is known from WO 03/080484 A1. Read/write devices, which are arranged on the tracks, are provided for the contactless writing and reading of data onto data carriers. At least one of these data carriers is arranged on each transport car. An identifier, that clearly identifies each transport car, is stored on each data carrier, and/or the data carrier is configured in the manner of a transponder. Each transport car preferably transports at least one reel of material to a reel changer of a web-processing machine.

A thermal transfer printer for printing print media having RFID labels is known. The thermal transfer printer can be controlled based upon information stored in a data memory of the RFID label. In the RFID label, an identifier is stored, which clearly identifies the respective RFID label. When the print medium with the RFID label passes an RFID reading unit, the print medium is detected by the RFID reading unit. The RFID reading unit continuously emits signals prompting the RFID label to send back its identifier.

U.S. Pat. No. 6,409,401 B1 relates to a transportable printer with an RFID encoder, which acquires information stored in a printable medium that has an RFID, such as, for example, a strip of paper. The data stored in the RFID relates, for example, to information that is used to identify the relevant medium.

SUMMARY OF THE INVENTION

The object of the present invention is to provide a logistics system for managing at least a warehouse of a printing company that operates at least one printing press.

The object is attained in accordance with the present invention by the provision of a warehouse that holds an amount of a printing substrate which is required for a specific production period. The printing substrate is supplied to at least one printing press based on production. An accompanying document is assigned to the printing substrate to be printed in the printing press. The accompanying document is configured as an electronic data set which is stored in a memory of an RFID tag. The data set includes data relating to an adhesive surface, generated on the printing substrate to be supplied to the printing press in an adhesive station. The data relating to the adhesive surface is written into the data set.

The benefits to be achieved with the present invention consist, in particular, that a commercial unit, which has an RFID tag, and which supplies a specific, limited quantity of a specific printing substrate, such as, for example, a reel of paper or a stack of printing sheets, can be identified, monitored along its transit path, and managed. In addition, process steps which are, or may be implemented with the commercial unit, such as, for example, a change in information relating to its delivery, a removal of packaging material used to package the commercial unit, and the like and/or especially a use of the printing substrate supplied with this commercial unit, is recorded directly in the data set that accompanies this commercial unit. This is possible because the data set can be changed even after shipping by the manufacturer of the printing substrate by the utilization of data transmitters that are authorized and/or approved to make such changes in the data set. Thus, the entire manufacturing process for this commercial unit of the printing substrate is recorded in a memory of the RFID tag, which RFID tag is attached to the commercial unit of the printing substrate, by an updating of the data set assigned to it. The updating of the data set, which is preferably continuous, can be accomplished by adding to, or by changing its data. The accompanying document for a printing substrate, which printing substrate is to be printed in a printing press, and the method for producing such an accompanying document, can be used particularly advantageously when the goal is to improve a printing process to be implemented using the printing substrate and/or to improve the quality of the printing substrate and/or of the printed product which is produced therefrom.

The data which is contained in the data set can adhere, in terms of their syntax and semantics, to a standard that is used in the field of logistics. The data set can thus be encoded, read out and interpreted by a plurality of firms, and especially by different firms which are to be included in the exchange of data, even when these firms are located in different countries. In the field of logistics, including the fields for the paper manufacturing and the paper processing industries, data standards for the flow of material, such as, for example, from the paper mill to a printing company, have already been developed. One example is the papiNet standard, such as it occurs in its version 2.20 of January 2004. Accordingly, the data set, which is stored in an RFID tag that is attached to a commercial unit of the printing substrate, can be incorporated into a data network that includes at least the paper mill which ships the printing substrate and the printing company that receives the printing substrate.

The use of an RFID tag, that employs an electromagnetic microwave for data transmission, also ensures flexibility in the arrangement of the components which are involved in the transmission of data, which is necessary in the handling chain for a printing substrate. Those components, especially to the extent that they relate to the RFID tag, can be implemented very cost-effectively with low structural space requirements, and also enable a range for the transmission distance that exists between the RFID tag and an assigned read/write station, which range is necessary in warehouse logistics.

BRIEF DESCRIPTION OF THE DRAWING

A preferred embodiment of the present invention is represented in the drawing, and will be described in greater detail in what follows.

The sole drawing FIGURE is a block diagram that is representative a handling chain which is associated with a commercial unit or with a printing substrate.

DESCRIPTION OF THE PREFERRED EMBODIMENT

Large printing companies, and particularly those large printing companies that produce high-volume printed products, such as, for example, newspaper printing companies, require large amounts of printing substrate to operate their typically multiple printing presses. The invention will be described, in the following discussion, within the context of the example of a printing company that operates at least one web-fed rotary printing press. The required printing substrate is provided, in each such case, as a reel, and preferably is provided as a reel of paper. Alternatively, or additionally, the printing company can operate at least one sheet-fed printing press. The printing substrate which is required for this type of printing press is supplied as a stack of printing sheets. The printing substrate preferably consists, in each of the above-described cases of paper, cardboard, paperboard or a film. The printing company obtains each such printing substrate from a company that manufactures the printing substrate, such as, for example, from a paper mill. Large printing companies preferably have, for example, a plurality of high-speed printing presses, which can preferably also be operated independently of one another, and having a combined production rate of, for example, 80,000 or more printed copies per hour. Such a plurality of high-speed printing presses can have a combined demand of, for example, 5,000 or more reels of paper per week. Printing presses of this type are typically configured as printing systems having a plurality of sections, each of which comprises several printing towers. The plurality of such sections of the printing system can be operated independently of one another.

In the preferred embodiment of the present invention, the printing substrate is preferably supplied to the printing company by a paper mill or a similar supplier in a commercial unit of a reel. Delivery of these reels can be made via various transport devices, such as, for example, via truck, train or ship. In a goods receiving area at the printing company, the transport devices, which are useable for delivering the printing substrate, are unloaded. For example, the reels may be automatically unloaded by the use of a conveyor device, and are then stored in a warehouse belonging to the printing company. The warehouse of the printing company is principally structured to accommodate a demand for printing substrate that is required for a specific production period. Such a warehouse is also configured to supply the printing substrate to the at least one printing press or to each of the multiple printing presses based upon production requirements of the printing company. The warehouse can advantageously have different sections, such as, for example, a main warehouse and a buffer warehouse. The buffer warehouse is preferably assigned directly to a specific printing press. The printing substrate is stored intermediately in the buffer warehouse for only a relatively short period of time, typically only until the execution of a current production process which is planned for the assigned printing press. The buffer warehouse can be structured, for example, as a warehouse intended to hold the printing substrate required for a single day or even required for only a few hours. The main warehouse, in contrast, is generally structured to accommodate a considerably larger quantity of commercial units of the printing substrate as compared with the buffer warehouse, and may be typically, for example, in the form of a high-bay storage area. In the main warehouse, the delivered reels of paper are given time to adjust to the climate inside the printing company, and specifically to adjust to a temperature and a level of humidity that are present in the press hall of the printing company before being processed. The delivered reels of paper should be provided ten or more hours for this climatic adjustment process. The commercial units of the printing substrate can be transported within the printing company, such as, for example, from the goods receiving area to the main warehouse and/or from the main warehouse to the buffer warehouse and/or from the buffer warehouse to the respective reel changer of a printing press, via a rail-mounted or a non-rail-mounted, driverless transport system or via a manned or unmanned truck-mounted assembly, such as, for example, a stacking vehicle.

A reel of paper or a stack of printing sheets is usually delivered from the paper mill in packaging that encloses the printing substrate. This packaging is provided by the paper mill in order to protect the printing substrate, such as the paper to be printed, from dirt or from other possible damage on its way from the paper mill to the printing company. The transport weight of a commercial unit of a reel or of a stack of paper includes the weight of the packaging. The packaging is usually removed at an unpacking station which is located in the printing company, before the printing substrate is fed to the printing press either directly or, for example, via the buffer warehouse. Frequently, the printing substrate is weighed at a weighing station after being unpackaged and before being supplied to the printing press, in order to determine its net weight. The unpacking station and the weighing station are examples of components of an area of the printing company that is allocated to production preparation. Such a production preparation area is one in which the printing substrate is made ready for its use in the upcoming production to be performed using the respective printing press. In this context, the term production refers especially to the printing of the printing substrate, and can especially include a feeding of the printing substrate into the printing press prior to the actual printing. It can also include a step of clearing of the printing press of ink, which may be implemented using the printing substrate. During production, the printing substrate is typically wound off of the reel of paper or is unstacked from the paper stack.

In accordance with the configuration of the web-fed rotary printing press that is to be used and also in accordance with the printed product to be produced, different reels of paper can be used. These different reels of paper may differ, for example, in terms of their geometric dimensions, especially their axial length and/or their diameter, in the quantity and/or length of the printing substrate that is wound onto the respective reel, in the paper quality and/or in the base weight of the paper. Each respective web-fed rotary printing press can be provided with at least one reel changer to accommodate the reel of paper which has been supplied from the warehouse. The reel changer typically has at least one pair of support arms and is provided with a mechanism for adjusting the positioning of these support arms. Once such an adjustment of the at least one pair of support arms has been made, reels of paper of different axial lengths can be accommodated. The axial length of the reels of paper can be, for example, between 500 mm and 2,500 mm. A reel of paper can weigh several thousand kilograms.

The reel changer for each such web-fed rotary printing press is typically configured so that it executes a flying reel change on the printing press while that printing press is operating at its full production speed. To accomplish this flying reel change, a leading edge of the web of a new reel of paper is attached, most often using an adhesive connection to, for example, the trailing edge of the web of an exhausting reel of paper, the usable length of which has been essentially consumed. The adhesive connection is prepared on the leading edge of the web of a new reel of paper in an adhesive station and is prepared on each new reel of paper that is to be introduced in a running production process. This is done on each new reel of paper generally after it is unpacked in the unpacking station, and is accomplished by forming an adhesive surface on the span of the new reel of paper which is to be inserted into the production process. This is typically accomplished by applying at least one adhesive label to the leading edge of the web of this new reel of paper, wherein the adhesive label is, for example, a double-sided adhesive tape.

An RFID tag, which accompanies the reel of paper at least on its way from its manufacturing location to a printing press that will use the paper, preferably by printing on that paper, is applied to the reel of paper. Such an RFID tag is preferably placed in or on a winding core of the paper reel, on which winding core the paper, which is configured as a web, is wound. Such a winding core usually extends axially through the reel of paper, and preferably extends all the way through the reel of paper. The length of the winding core thus preferably corresponds to at least the width of the paper web. The winding core of the reel of paper typically has an outer diameter, for example, of less than 100 mm, and preferably has an outer diameter which is less than 80 mm. Depending upon its required rigidity and/or its load-bearing capacity, the winding core of the reel of paper, which winding core is preferably sleeve-shaped or tubular in configuration, can be made of, for example, cardboard, fiberboard, plastic or aluminum. Each winding core from used reels of paper is collected and is typically recycled and returned to the paper mill, so that the recycled winding cores can be wound again with a paper web and can be used to produce new reels of paper.

An RFID tag consists essentially of a microchip with a digital memory, and most often is also configured with an analog circuit for use in receiving and in transmitting data, an antenna, such as, for example, a dipole antenna, that is connected to the microchip, and a substrate or a housing for the microchip and the antenna. The antenna can, for example, be produced on the substrate using printing technology. So-called active RFID tags have their own energy supply for their microchip. This energy may be provided in the form of a battery, and especially in the form of a long-life battery, which long-life battery will ensure a supply of energy to the microchip, preferably for several years.

RFID tags communicate in wireless fashion, typically using electromagnetic waves, with a read/write station when such RFID tags are brought within the detection range of the read/write station. Frequency bands that are used by RFID tags lie within a frequency range that is officially approved for high-frequency transmitting devices, based upon legal provisions. RFID tags typically utilize a transmitting and/or receiving frequency of, for example, 125 kHz, 13.56 MHz, 433 MHz, 868 MHz, 915 MHz, 2.45 GHz or 5.6 GHz. When using RFID tags in a handling chain that is associated with a printing substrate, it is advantageous to select RFID tags which utilize the range of electromagnetic microwaves having a shorter wavelength, preferably a wavelength of, for example, between 1 mm and 1 m, which wavelength corresponds to a frequency range of 300 MHz to 300 GHz. The detection range of RFID tags of this type, in combination with their associated read/write stations, typically extends over several meters, and may extend up to as much as 3 m or even as far as 7 m. In combination with active microchips, the detection range of such RFID tags can also be 30 m or more. A high degree of flexibility, in terms of the arrangement of the RFID tag and the associated read/write station, can thus be achieved. RFID tags that use an electromagnetic microwave for data transmission are also small in dimension and can be produced cost-effectively. They have the additional advantage that, because of the short wavelength, the antennae of the RFID tag and of the assigned read/write station need not be oriented precisely toward one another.

The digital memory of the microchip of an RFID tag is typically at least partially rewritable, such as, for example, up to one hundred thousand times or more. The storage capacity can be as much as 2,048 bits or more. The transmission of data between an RFID tag and a read/write station, which data transmission preferably uses a standardized protocol, can have a baud rate of, for example, 640 kbit/s or more. RFID tags can have an algorithm that allows them to transmit and/or receive at least a portion of the data in encoded form, so that such encoded data on the RFID tag can be read or written only with authorization. It is advantageous to also provide that data on the RFID tag can be transmitted only after the particular RFID tag has been clearly identified in its communication with a read/write station. To this end, each individual RFID tag, that is used in a larger network of RFID tags, can be unambiguously addressed. In communication among a plurality of RFID tags and a read/write station, a routine can also be provided, according to which the relevant RFID tags are specifically addressed cyclically by the read/write station, such as, for example, in a continuous process.

At least one RFID tag writing station is provided in the paper mill, and is used to write data into the memory of the RFID tag which is associated with a finished reel of paper. As discussed previously, the RFID tag is preferably attached in or on the winding core of the reel of paper. The data can contain information relating to, for example, the manufacturer of the paper reel, such as, for example, the name and/or the location of the paper mill, and can also contain information relating to the paper making or winding machine that was used to manufacture the reel of paper, the production series, the reel number, the production date, the reel position, the type of packaging used for the reel of paper, such as, for example, whether a package contains double rolls, the gross and/or net weight of the reel of paper, the paper color, the paper length, the base weight, the roll width, the shipping and/or the customer. Some of this data, especially that data which is relevant to transport, such as the gross weight of the reel of paper and/or the delivery address, can be read out, for example, by the transport firm which may be, for example, the shipping company, and can be used to optimize the transport process of the finished reel of paper or the finished stack of paper.

At the time when the reel of paper arrives at the goods receiving area of the customer, such as, for example, the printing company or shortly thereafter, the data previously stored by the supplier, such as by the paper mill, in the memory of the RFID tag, can be read out at a suitable reading station. By comparing this read-out data with a purchase order which had been placed previously by the printing company, the delivery from the paper mill can be checked for accuracy. For instance, such a delivery can be checked to determine whether the correct type of paper reel with the correct type of paper and/or with the correct base weight and/or with the correct geometric data for the reel of paper, has been supplied. The gross weight of the reel of paper can also be determined, for example, at a weighing station in the goods receiving area. Therefore, through the use of a contactless electronic data acquisition, preferably by the first reading station in the handling chain of the printing company, the data set that accompanies the respective printing reel of paper in the memory of the RFID tag can be used, in an automated operational process, to verify the information that was provided by the supplier. If, in the comparison of the data obtained in the printing company with the information from the supplier, a relevant deviation is found, for instance, one that exceeds a previously established tolerance limit, the currently obtained value, such as, for example, for the base weight, the geometric data or the gross weight, can be stored in the data set of the RFID tag using a writing station. If the delivered reel of paper is to be assigned to a specific printing press or is to be used in a specific printing task in the printing company, the information on this particular condition, together with information on the intended storage location in the warehouse of the printing company, can be written as data into the memory of the RFID tag at the writing station.

Conveyor systems which are frequently used within the printing company, such as, for example, cars of a driverless transport system, a rack-mounted vehicle, a rolling carriage and the like, read the data regarding, for instance, the intended storage location in the warehouse of the printing company, or at least use this data, and store the reel of paper in the planned warehouse location in accordance with this data. The time of the placement of a specific reel in storage can be recorded in the data set of the RFID tag. This can be done to make it possible for a logistics system, which is used to manage at least the warehouse, to decide how to assign priority, in the printing process, to the reel of paper having the oldest time status, if, for example, a plurality of reels of paper of the same type are present. The storage location for the reel of paper, and other information on its properties can also be registered in the logistics system. The logistics system can, for example, be a component of a data network, which, among other features, also exchanges data from the data set stored in the memory of the RFID tag, at least between the paper mill that ships the printing substrate and the printing company that receives the printing substrate. The data network can interconnect all of the functional units or departments within the printing company that cooperate with one another. It can also receive data from printing presses which are used in the printing company and can use this data, for example, to achieve control tasks, wherein data relating to a printing press is stored in the data network, after it has been received from a control center that is a part of that printing press. Because of the data technology interconnection, at least within the printing firm, the data that is relating to the logistics of the paper reels can be called up and can be displayed at the control center of a printing press.

When a print order, which is to be executed on the printing press or on one of the printing presses, is being planned, a decision is made as to what quantity of, and what type of paper reel is to be held in the buffer warehouse assigned to said printing press, such as, for example, by moving it from the main warehouse. As a result of this decision, the logistics system, which manages at least the warehouse, causes the necessary number of paper reels to be processed and to be placed for holding in the buffer warehouse. The reels of paper are preferably unpacked and/or weighed on their way to the buffer warehouse, and are also prepared, such as, for example, for a non-stop or flying paper reel change. At the unpacking station of the printing company, the protective outer packaging is manually or, more preferably, is automatically removed from the reels of paper. An automatic unpacking station can read out data relating to the geometry of the reels of paper from their respective RFID tag. The automatic unpacking station can use this data to adjust and/or to guide the assemblies which are used for removing the protective packaging, such as, for example, a cutting device, accordingly. Once the outer, protective packaging, that encloses the reel of paper, has been removed, the reel of paper can be reweighed. This reel weight, which represents the first or full reel net weight, is stored in the data set of the RFID tag. Once any outer layers of paper that have, for example, been damaged during transport, have been peeled off of the reel of paper, a usable net reel weight, that represents a second net weight, results. This second net weight is also stored in the data set of the RFID tag, preferably in addition to the first net weight. The current diameter of the reel of paper that has been prepared for use in production, which is preferably automatically determined by a measuring device, can also be stored in the data set.

It can also be advantageous to acquire additional data that is especially relevant to the further processing of the reel of paper, such as, for example, data that is relevant to the printing process, and to add this additional data to the data set of the RFID tag. For example, data relating to a possible non-circularity of the reel of paper, to a possible indentation and/or to a flattened area on the reel of paper and/or to an inclination of the reel of paper toward one of the end surfaces of the reel of paper, to a concave or convex or conical deformation of the reel of paper as a deviation from its ideal cylindrical form, to an eccentricity of the winding core, to an unevenness in the end surfaces of the reel of paper, such as may occur, for example, as a result of a shifting of the winding core in relation to the outer layers of the reel of paper near its periphery, or to some similar parameter which can affect the further processability of the reel of paper, especially in terms of its unwinding process can all be added to the data set in the RFID tag. If it is determined, for example, through the use of this acquired data, that, in comparison with a preset target value, a previously established tolerance limit has now been exceeded, the respective, relevant reel of paper can be excluded from further processing in the printing company. In that situation, the data set of the RFID tag receives, for example, a stop mark, assuming that the detected defect in the reel of paper cannot be corrected on site. An otherwise possible disruption of the further processing of this now determined defective roll is prevented. Thus, using data from the data set of the RFID tag, a determination can be made whether or not a reel of paper can be approved for further processing in the printing press. If the criteria for approval of the reel of paper in the production process are not met, the relevant reel of paper can, for instance, be excluded from being placed on a reel changer or from being accelerated, on the reel changer, up to a high rotational speed.

As was previously mentioned, in the preparation of a new paper reel for a non-stop or flying paper reel change, at least one adhesive surface is formed, at an adhesive station, on a leading web edge of the new reel of paper which is to be inserted into the running production process. For example, at least one adhesive label is applied to the leading web edge of the new reel of paper. This adhesive label can consist of, for example, an adhesive tape that has adhesive on both sides. The adhesive effect of the adhesive surface, typically configured as the adhesive label, generally lasts for only a limited time, typically for a few hours, such as, for example, for 8 hours to 72 hours, and preferably lasts up to 24 hours. The duration of the adhesive effect is dependent, for example, upon the adhesive substance that is used and/or upon the climatic conditions surrounding the adhesive surface. Such favorable climatic conditions exist, for example, at a surrounding temperature of between 21° C. and 28° C., and at a humidity level in the area of between 50% and 65% relative humidity. Once this optimum period of time has elapsed, the adhesive surface, typically provided by the adhesive label, must be renewed, in order to ensure sufficient adhesive effect for use in effectively accomplishing the non-stop or flying paper reel change, if the new reel of paper has not yet been placed in print production and is still being held in intermediate storage. The implementation of the application of the adhesive label as such, such as, for example, whether or not this adhesion, in preparation for production, has been performed, and/or the time of this adhesive application can be documented in the data set of the RFID tag. The latter information enables a conclusion to be made regarding the presumed duration of the prepared adhesive connection, and/or regarding when this adhesive connection must be renewed and accordingly when the reel of paper must, for example, be transported out of the buffer warehouse and back to the adhesive station, if this new reel of paper, which has previously been prepared in this manner, has not yet been introduced into the production process by a certain time.

The duration of the presumed life of the prepared adhesive connection and/or, for example, a determined date of expiration of the effectiveness of this prepared adhesive connection can also be recorded in the data set of the RFID tag as information. Other data, which can be written into the data set regarding the creation of an adhesive surface on the printing substrate that is to be fed to the printing press, in preparation for production, can relate to, for example, at least one dimension, and preferably to the dimensions of the adhesive surface. Such dimensions of the adhesive surface can include its edge length, and/or a position of the adhesive surface on the printing substrate and can also include information on the type of adhesive label that is used. The type of adhesive label data indicates, for example, what manufacturer supplied the adhesive label, and/or what product identifier this adhesive label bears. Different types of adhesive labels can differ in terms of their adhesive material, and therefore can also vary in terms of the efficacy and/or of the duration of the prepared adhesive connection. For those reasons, printing substrates, which are supplied with different adhesive labels, must be handled differently, in terms of their preparation, at the printing press.

Once the reel of paper has been unpacked and the adhesive label has been applied to its leading end surface, the now prepared reel of paper is ready to be inserted into the production process. Until shortly before its actual use in the printing press, the now-prepared reel of paper is stored intermediately in the buffer warehouse. At its introduction into the production process, the reel of paper is moved out of the buffer warehouse, preferably using an automatic conveyor system, and is moved to the reel changer, where it is received by a pair of support arms of the reel changer. The positioning of the pair of support arms of the reel changer is adjusted, such as, for example, with respect to their setting and/or with respect to the distance between the support arms, using data, and especially using currently valid geometric that is contained data in the data set of the RFID tag. The data set of the RFID tag can also be used to determine whether a reel adapter is necessary to load this reel of paper onto the axle of the reel changer. It is also advantageous to provide, in the data set of the RFID tag of a reel of paper that has been only partially consumed, data relating to lateral register positioning and/or web control. When this partially consumed reel of paper is reintroduced into the production process, the pair of support arms of the reel changer can also be correctly positioned axially by reading out this stored data. The axial positioning of the pair of support arms of the reel changer can also be readjusted, during the production process, using data obtained from the data set of the RFID tag, to allow for possible unevenness in the end surfaces of the reel of paper. Such an unevenness may result from a shifting of the winding core, in relation to the outer layers of the reel of paper near its periphery. In general, adjustment processes and/or adjustment times for the reel changer can be optimized using the data that is stored in the data set of the RFID tag and which can be supplied to a control system of the reel changer.

To adjust the pair of support arms of the reel changer, further data, in addition to that which can be obtained from the data set of the RFID tag, may be necessary. Such additional data may be supplied, for example, by at least one sensor and/or by at least one position indicator of the control system which controls the reel changer. The adjustment of the positioning of the pair of support arms of the reel changer can be accomplished by linking the data that can be obtained from the data set of the RFID tag with the data from the control system that is connected to the reel changer.

No measuring devices, for use in measuring the reel of paper, are necessary on the reel changer. Instead, only a reading station, for reading data from the data set of the RFID tag, is needed. However, at least one sensor and/or at least one position indicator may be necessary. Both of these can provide information, regarding a position of the new reel of paper to be loaded onto the axle, in relation to the pair of support arms of the reel changer. Data in the data set of an RFID tag, which is read out by the reading station that is assigned to the reel changer, can be unambiguously connected with a specific reel of paper to be loaded onto the axle of the reel changer by linking it with data from at least one other operational process. Confusion with another reel of paper, that may be located near the reel changer, is thus reliably ruled out. The aforementioned data linkage can therefore consist, at least, of a plausibility test, conducted by the control system of the reel changer, with respect to the data obtained from the data set of an RFID tag.

A writing station is also advantageously provided on the reel changer, and is usable for writing data into the data set of the RFID tag of a reel of paper that has been placed in the production process. This data may be regarding the degree to which this reel of paper has already been consumed, especially in the implementation of the printing process. Such data, which characterizes the consumption of the reel of paper, can be determined, for example, from the number of rotations of the reel of paper being held between the support arms of the reel changer. An unwound web length of the reel of paper can be calculated from its number of rotations. From this, in turn, and with a known original paper web length, a remaining web length can be calculated, and/or with a known original diameter, the current diameter of the reel of paper can be calculated.

A reel of paper that has been only partially consumed, in the implementation of a current printing task, can removed from the reel changer and can be, for example, returned to the buffer warehouse. Data that characterizes an only partially consumed reel of paper, can be written into the memory of the RFID tag, such as, for example, as this reel of paper is being removed from the axle of the reel changer. The data set can also be supplemented with information regarding the print task and/or the time in which the remaining quantity of paper was left on the reel of paper. The storage location, in which the only partially consumed reel of paper is to be placed, can be based upon this information.

To improve the quality of the printing substrate and/or of the printed products produced therefrom, or in other words, in order to perform a production evaluation in support of quality management, it is also advantageous to provide the data set of an only partially consumed reel of paper with data relating to whether a web break and/or some other type of damage to the reel of paper has occurred during execution of the printing task that used this reel of paper. Information as to what condition the reel of paper is in, for example, at the end of the printing task which had been executed using this reel of paper can also be stored. Such information is beneficial in a determination of whether the remainder of the material web on this reel of paper can be used in another printing process or whether it must be excluded from this subsequent printing process to avoid risking further disruption of production. Information regarding the time at which the event occurred, and/or after what development the event occurred, can be added to this status data. This data can be very informative, either taken alone or viewed together, for the printing company, and/or for the paper mill, once at least the winding core of the reel of paper that bears the RFID tag has been sent back to it, if the intention is to improve the quality of the reel of paper and/or of the printed products which are produced from such a reel of paper. Accordingly, using the data that is updated in the memory of the RFID tag, such as, for example, during a recycling process and/or a return process involving the reels of paper can be controlled.

The data set which is stored in the memory of the RFID tag represents an accompanying document for the reel of paper, to which reel of paper the RFID tag is physically attached. The data, that is contained in the data set, can be stored in one or more data files. For writing in and/or reading out at least a portion of the data stored in the memory of the RFID tag, access rights and/or authorizations can advantageously be established. Transactions involving data and/or their alteration can thus be performed by only those who are authorized to do so. An updating of the data set then takes place only following approval and/or authentication of a data transmitter that will alter the data set.

The accompanying document contains far more data than is necessary to identify and/or to manage the commercial unit that bears the RFID tag. In the data set that represents the accompanying document, preferably all significant changes to this commercial unit and/or all important actions involving the printing substrate that is conveyed in this commercial unit are preferably registered and recorded. The data compiled in the record can, in turn, be used for control and regulation tasks within the handling chain that is connected with this commercial unit or with the printing substrate, such as, for example, to control a transport device and/or a reel changer.

The sole FIGURE uses a block diagram to illustrate again, by way of example, the handling chain for a commercial unit that supplies a printing substrate. For example, a reel of paper, which is not specifically depicted and which has been manufactured in a paper mill 01, is transported via a transport system 02 to a printing company 03, where it is delivered to a goods receiving area 04 of the printing company 03. From the goods receiving area 04, the reel of paper can be placed directly in storage in a warehouse 06 of the printing company 03. Warehouse 06 is, for example, managed by a logistics system 09. The reel of paper can be placed in a main warehouse 07 or in a buffer warehouse 08 under the control of the logistics system 09. Based upon planned production of the printing plant or company 03, the particular reel of paper, that is required to execute a printing task, is transferred from the main warehouse 07 to a buffer warehouse 08. A reel of paper, which has just been delivered from the paper mill 01, can be transported alternatively directly from the goods receiving area 04, from the main warehouse 07, or from the buffer warehouse 08, to a preparation station 13, and especially to an unpacking station 13, in order to, for example, accomplish the removal of outside packaging that is protecting the printing substrate on the reel of paper. The now unpacked reel of paper can then be weighed at a weighing station 14 to determine its first and second net weight, as discussed previously. Afterward, the reel of paper can be prepared in an adhesive station 16, which is preferably also a part of the preparation station 13, for use in a reel change that is to be implemented, for example, while the printing press 12 is in a production run. The reel of paper, which has been prepared in this manner, is now supplied to a reel changer 11, which is assigned to a printing press 12, either directly, or alternatively following a period of intermediate storage in the buffer warehouse 08. At the reel changer 11, the reel of paper is introduced into the typically ongoing or running production process. A prepared reel of paper can also be brought from the unpacking station 13 directly to the adhesive station 16, or can be moved from the unpacking station 13 or from the adhesive station 16 back to storage in the buffer warehouse 13. It is also possible to supply a prepared reel of paper from the unpacking station 13 or from the adhesive station 16 directly to the reel changer 11. Once the particular printing task has been completed, a reel of paper, that has been only partially consumed, can be removed from the reel changer 11 and can be returned to storage in the warehouse 06, either into the main warehouse 07 or into the buffer warehouse 08. A winding core of an empty paper reel can be forwarded or returned to the paper mill 01, typically via the transport system 02, for reuse. The printing press 12 is preferably assigned to, or provided with a control center 18. The control center 18 has, for example, at least one display device and also has at least one operating element. Control or regulating processes, which are to be executed with, or in the printing press 12, can be adjusted at the control center 18. The control center 18 is connected, in terms of data technology, to the logistics system 09 which is also used to manage the warehouse 06 of the printing company 03, via, for example, a shared data network. Data can thus be exchanged between the control center 18 and the logistics system 09, and can be displayed, for example, on the display device of the control center 18 by an operator of the printing press 12 for accomplishing various monitoring purposes.

A plurality of the functional units in this printing substrate handling chain, and preferably all such functional units, which implement a change to the commercial unit and/or the substrate, such as, for example, the paper mill 01, the transport system 02, the goods receiving area 04 of the printing company 03, the main warehouse 07 or the buffer warehouse 08 of the storage warehouse 06, the reel changer 11, the unpacking station 13, the weighing station 14 or the adhesive station 16, each have at least one reading station 17, and preferably each have a combined read/write station 17. Such a station 17 is provided at each functional unit in order to perform an exchange of data with the memory of the RFID tag provided as the accompanying document assigned to the printing substrate to be printed. Data stored at the RFID tag can at least be read out. Preferably, a record in the data set, which is stored in the memory of the RFID tag, is updated at each of the respective read/write stations 17. As a result, all of the events that are significant to this handling chain and which are connected with the commercial unit and/or with the printing substrate, are registered. The memory of the RFID tag, as it relates to the commercial unit and/or to the printing substrate supplied by the commercial unit, therefore has the function of an electronically guided logbook or an accompanying document. Furthermore, data that is contained in the data set can especially be used within the described handling chain for control and regulation tasks. Thus, data for use in controlling or for use in regulating the printing press 12 can be transferred to at least one of the writing and/or reading stations 17, which are located in the printing company 03, for storage in the memory of the RFID tag. This data transfer is preferably implemented via the control center 18 of the printing press 12.

While a preferred embodiment of a logistics system for managing at least a warehouse of a printing company that operates at least one printing press, in accordance with the present invention, has been set forth fully and completely hereinabove, it will be apparent to one of skill in the art that various changes in, for example, the specific construction of the paper reel transport system, the particular operation of the adhesive application device, and the like could be made without departing from the true spirit and scope of the subject invention which is accordingly to be limited only by the appended claims.

What is claimed is:

1. A logistics system for management of a printing company having at least one printing press, said logistics system comprising:
   a warehouse usable to store an amount of a printing substrate configured as reels of paper and required by said printing company for production of a printed product during a specific production period;
   means for supplying each said reel of paper from said warehouse to said at least one printing press for said production of said printed product;
   an accompanying document associated with each said reel of paper to be printed in said printing press, said accompanying document being configured as an electronic data set;
   an RFID tag associated with each said reel of paper and having a memory, said electronic data set being stored in said memory;
   an adhesive preparation station for said reels of paper and usable to apply an adhesive substance to each said reel of paper to form an adhesive surface on each said reel of paper prior to said production of said printed product using a selected one of said reels of paper;
   data relating to said adhesive surface formed on each said reel of paper, said data being written into said data set, said data including at least one of information as to a time said adhesive surface is generated, a dimension of said adhesive surface, a position of said adhesive surface on said printing substrate, information based on said adhesive substrate used to generate said adhesive surface and a type of adhesive label used to form said adhesive substrate; and
   data relevant to processing of each said reel of paper and written into said data set, said data relevant to said processing including at least one of a possible non-circularity of said reel of paper, an indentation in said reel of paper, and inclination of said reel of paper to an end surface of said reel of paper, and to an unevenness in end surfaces of said reel of paper, whereby said data is usable to handle each said reel of paper properly in said production of said printed product by said at least one printing press.

2. The logistics system of claim 1 further including a commercial unit usable to supply said reels of paper and wherein said RFID tag is applied to said commercial unit.

3. The logistics system of claim 2 wherein said commercial unit carries said printing substrate that has been partially used in said production of a printed product and wherein said data set includes event data associated with said partially used printing substrate, said event being at least one of a break in said printing substrate and damages to said commercial unit.

4. The logistics system of claim 1 wherein said reel of paper has a winding core and further wherein said RFID tag is applied to said winding core.

5. The logistics system of claim 1 wherein said data further includes one of paper reel manufacturer information and printing substrate supplier information.

6. The logistics system of claim 1 wherein said data set includes paper reel manufacture information.

7. The logistics system of claim 1 wherein said data set further includes at least one of paper manufacturing machine data, production series data, reel number data, printing substrate production date data and reel position data.

8. The logistics system of claim 1 wherein said data set further includes at least one of printing substrate color data, printing substrate length data, printing substrate width data, and printing substrate base weight data.

9. The logistics system of claim 1 wherein said data set further includes approval of said printing substrate for said production of a printed product data.

10. The logistics system of claim 1 wherein said data set further includes at least one of packaging data, shipping data and customers for said printing substrate data.

11. The logistics system of claim 1 wherein said data set further includes planned storage location data for said printing substrate in said warehouse.

12. The logistics system of claim 1 further including a printing substrate unpacking station and wherein unpacking station data is written into said data set.

13. The logistics system of claim 1 wherein said data set further includes at least one of gross and net weight of said printing substrate data.

14. The logistics system of claim 1 wherein said data set further includes at least one of printing press controlling and regulating data.

15. The logistics system of claim 1 wherein said data set further includes consumption of said printing substrate in said production of said printed product data.

16. The logistics system of claim 1 wherein said data set further includes a remaining quantity of said printing substrate usable in said production of said printed product data.

17. The logistics system of claim 1 wherein said data set further includes at least one of lateral registration positioning data and web control data for said printing substrate at least partially consumed in said specific production period.

18. The logistics system of claim 1 wherein said data set further includes printing substrate preparation for a flying reel change data.

19. The logistics system of claim 1 further including a reel changer having a pair of support arms in said printing press, said data set further including one of adjustment and setting data for said pair of support arms.

20. The logistics system of claim 1 wherein at least a portion of said data set is encoded data.

21. The logistics system of claim 1 wherein said data set uses syntax and semantics which adhere to a standard usable in the field of logistics.

22. The logistics system of claim 1 wherein said RFID tag includes its own power supply.

23. The logistics system of claim 1 further including at least one read/write station adapted to exchange said data with said RFID tag using an electromagnetic microwave having a frequency of at least 300 MHs.

24. The logistics system of claim 1 wherein said RFID tag has a transmitting/receiving frequency of one of 433 MHz, 868 MHz, 915 MHz, 2.45 GHz and 5.6 GHz.

25. The logistics system of claim 1 further including an RFID read/write station with a detection range of at least 3 m.

* * * * *